UNITED STATES PATENT OFFICE.

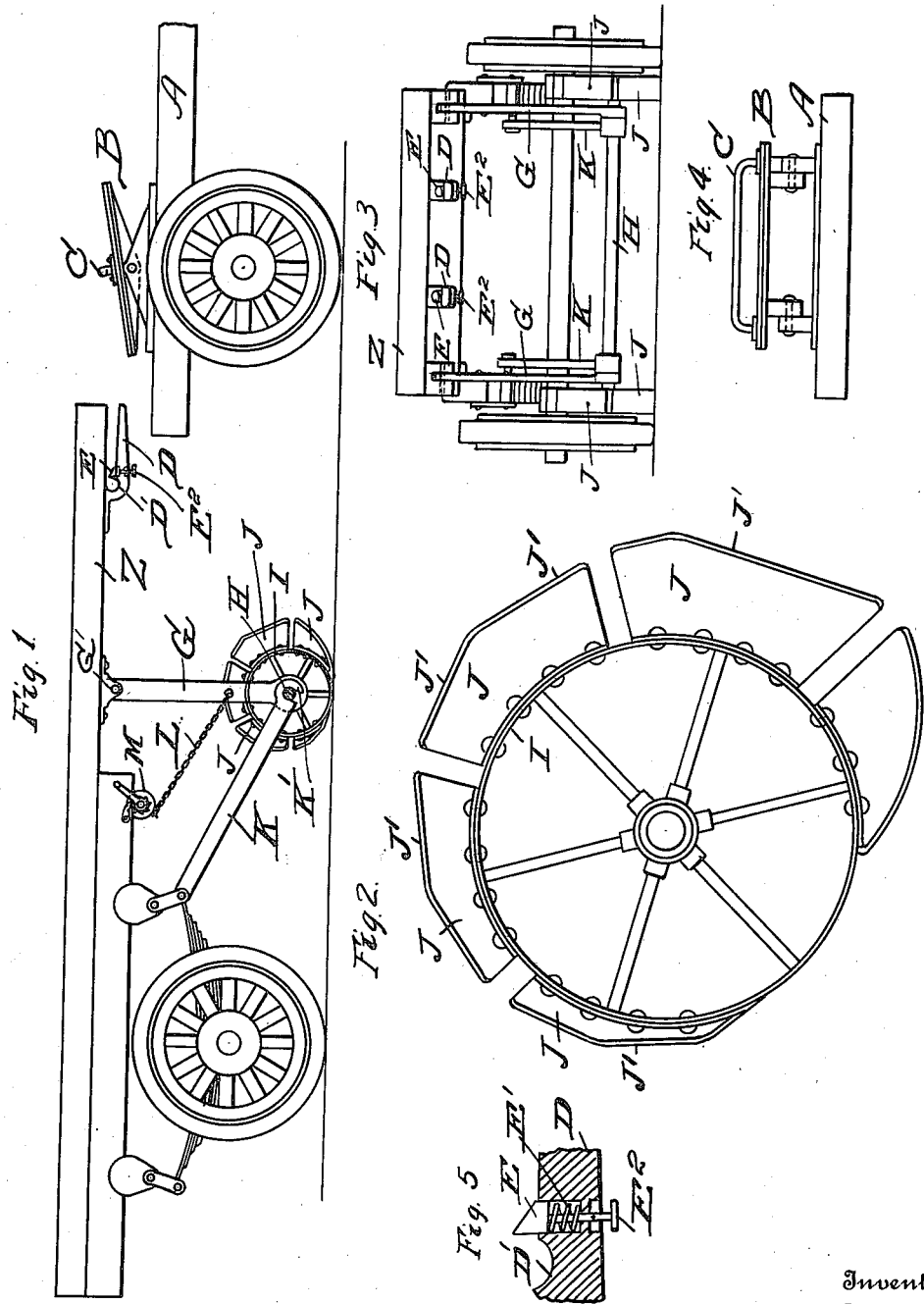

CHARLES H. LAND, JR., OF DETROIT, MICHIGAN, ASSIGNOR OF SIX-TENTHS TO BENJAMIN N. CUTTING, OF DETROIT, MICHIGAN.

AUTOMATIC SUPPORTING-JACK.

1,303,922. Specification of Letters Patent. Patented May 20, 1919.

Application filed January 29, 1919. Serial No. 273,723.

*To all whom it may concern:*

Be it known that I, CHARLES H. LAND, Jr., citizen of the United States, residing at Detroit, county of Wayne, State of Michigan, have invented a certain new and useful Improvement in Automatic Supporting-Jacks, and declare the following to be a full, clear, and exact description of the same, such as will enable others skilled in the art to which it pertains to make and use the same, reference being had to the accompanying drawings, which form a part of this specification.

My invention relates to an automatic supporting jack for trailers, shown in the accompanying drawings and more particularly described in the following specification and claims:—

The object of this invention is to provide an automatic jack or lifting device combined with the supporting leg of a semi-trailer, whereby the coupling together of a tractor and trailer may be simplified and more readily accomplished.

In many types of semi-trailers it has been the usual practice when connecting the trailer to a tractor,—or upon disconnecting it therefrom, to manually raise and lower the trailer by jacks of the worm or ratchet type. This is a slow and tedious process especially when the loads carried are several tons in weight, and therefore it is one of the purposes of this invention to provide means, other than a manually operated jack, to accomplish the desired result. In putting this object into practice a cam-shaped jack is attached to the foot of the supporting leg of a trailer, whereby upon being operated a sufficient gradual lift is obtained so that the tractor and trailer may be readily and automatically connected together.

Another feature of the invention is the jack-cam which is constructed of gradually increasing "flat-faced" lugs, forming a spiral cam,—the "flat faces" of the cam being adapted to successively bear upon the surface of the road in such manner as will not admit of the trailer rolling away from the tractor upon backing the latter into coupling relation with the trailer.

With the foregoing and other objects in view which will appear as the description proceeds, the invention resides in the combination and arrangement of parts and in the details of construction hereafter described and claimed, it being understood that changes may be made in the precise embodiment of the invention herein disclosed without departing from the spirit of the same.

In the accompanying drawings forming part of this specification:—

Figure 1 is a side elevation of a trailer with my invention installed thereon, showing also a fragmentary view of a truck or tractor, on which is mounted a fifth wheel provided with coupling means adapted to coöperate with coupling means carried by the trailer:—the view showing the truck or tractor as it would appear when about to be coupled with the trailer.

Fig. 2 is an enlarged side elevation of the cam-shaped wheel, or jack.

Fig. 3 is an end elevation of the trailer showing the engaging hooks which coöperate with means carried by the fifth wheel mounted upon the frame of the truck or tractor, for connecting the tractor and trailer together.

Fig. 4 is an elevation of a detail showing the bar carried by the fifth wheel of the truck or tractor to receive the connecting hooks of the trailer.

Fig. 5 is a detail of a spring actuated latch carried by the hooks of the trailer, adapted to automatically engage the bar carried by the fifth wheel of the truck or trailer upon the bar being brought into interlocking relation therewith.

Referring now to the letters of reference placed upon the drawings:—

A, indicates a truck or tractor frame on which is bolted a fifth wheel B;—to the upper member of which is bolted a guide bar C; in spaced relation thereto, shown in Fig. 4, of the drawings.

To the trailer frame Z and in spaced relation to each other, as shown in Fig. 3, are bolted guides or hooks D, D, adapted to enter beneath the bar C, when brought into operative relation therewith. E, E, are spring actuated latches, adapted to be forced down by the bar C, upon entering the recess $D^1$, provided at the back of the hooks for its reception. Upon the bar passing beyond the latches the springs $E^1$, of the latter will force up the latch and thus automatically secure the bar C, in the recesses $D^1$, until manually released. E², is a projecting handle secured to the latch for manually retracting the latter against the action of the spring.

To the trailer frame z, are attached a pair of swinging legs G, pivoted at G¹:—and at their lower end is journaled an axle H, on which are mounted a pair of wheels I, which rotate thereon.

To the face of the wheel is bolted a plurality of lugs or plates J, having flat treads J¹, which together form a gradually expanding "spiral" or cam, adapted when forced to rotate by the action of the truck or tractor, to gradually lift the forward end of the trailer in order that the hooks or guides D, D, may readily enter beneath the transverse bar C, of the fifth wheel to engage therewith.

K, is a brace pivoted to a suitable support upon the trailer and provided at its forward end with a hook K¹, to engage the axle H.

L, indicates a chain secured to the swinging legs G, connected with a suitable winding drum M, for raising and lowering the legs as may be required.

Having indicated the several parts by reference letters the construction and operation of the invention will be readily understood:—

In connecting the trailer with a tractor, the latter is backed into such a position that the transverse bar C, engages the hooks or guides D, D, which are formed with inclined faces. If inequalities of the road surface prevent easy sliding of the transverse bar C, along the guides D, D, the trailer is forced backward actuating the cam wheels I, which revolve in a step by step manner and gradually lift the trailer allowing the bar C, to slide easily over the spring latches E, and into locking position.

The flattened faces of the cam I, offer sufficient resistance to overcome any tendency of the trailer rolling away from the tractor as the latter is backed into position.

Having thus described my invention what I claim is:—

1. In a vehicle, an axle, and a gradually expanding cam composed of separate cam elements carried by said axle adapted to bear upon the road surface, whereby upon being rotated it may lift said vehicle above its normal plane.

2. In a vehicle, an axle journaled in the vehicle, and a gradually expanding cam having a plurality of flat faces arranged at intervals and adapted to bear upon the road surface, whereby upon said cam being rotated, the vehicle may be raised in a step by step manner and held against rolling.

3. In a vehicle, an axle and a gradually expanding cam carried by the axle and composed of a plurality of separate cam elements arranged in spaced relation and provided with flat faces and adapted to hold the vehicle against rolling.

4. In a device of the character described, a vehicle, a swinging leg pivoted to the vehicle frame, an expanding and rotatable cam carried by the leg adapted to bear upon the road surface, whereby it may lift the vehicle upon rotation, means for holding the leg in position to support the vehicle.

5. In a device of the character described, a vehicle having supporting wheels, a swinging leg pivoted to the vehicle in advance of the supporting wheels, means for holding the leg in rigid relation with the vehicle and an expanding rotatable cam carried by the leg and adapted to bear upon the road surface when the leg is held rigid with the vehicle whereby the cam is adapted to lift the vehicle.

6. In a device of the character described, a vehicle having supporting wheels, a swinging leg pivoted to the vehicle in advance of the wheels, means for holding the leg rigid with the vehicle, expanding cam carried by the swinging leg and provided with a plurality of flat faces arranged to engage the road surface when the leg is held rigid with the vehicle, and means for supporting the leg and the cam in an elevated position when the leg is released.

In testimony whereof, I sign this specification in the presence of two witnesses.

CHARLES H. LAND, JR.

Witnesses:
S. E. THOMAS,
EDWIN R. MONNIG.